(12) United States Patent
Ohki

(10) Patent No.: US 7,549,619 B2
(45) Date of Patent: Jun. 23, 2009

(54) VISCOUS FLUID-FILLED DAMPER AND MOUNTING STRUCTURE FOR VISCOUS FLUID-FILLED DAMPER

(75) Inventor: Junji Ohki, Tokyo (JP)

(73) Assignee: Polymatech Co., Ltd., Tokyo (JP)

( * ) Notice: Subject to any disclaimer, the term of this patent is extended or adjusted under 35 U.S.C. 154(b) by 342 days.

(21) Appl. No.: 11/491,946

(22) Filed: Jul. 25, 2006

(65) Prior Publication Data

US 2007/0023246 A1 Feb. 1, 2007

(30) Foreign Application Priority Data

Jul. 27, 2005 (JP) ............................. 2005-217212

(51) Int. Cl.
*F16M 13/00* (2006.01)
(52) U.S. Cl. .................. 267/140.13; 248/562; 248/638
(58) Field of Classification Search ................ 188/290, 188/293, 322.5, 381; 267/113, 136, 140.12, 267/140.13; 248/562, 638
See application file for complete search history.

(56) References Cited

U.S. PATENT DOCUMENTS

| | | | | |
|---|---|---|---|---|
| 5,145,039 | A * | 9/1992 | Morikawa et al. | 188/298 |
| 5,323,885 | A * | 6/1994 | Fukunaga et al. | 188/381 |
| 6,039,299 | A * | 3/2000 | Ohnishi et al. | 248/562 |
| 6,068,275 | A * | 5/2000 | Chino | 280/124.112 |
| 6,439,551 | B1 * | 8/2002 | Kato | 267/113 |
| 2002/0089101 | A1 * | 7/2002 | Itakura | 267/136 |
| 2003/0112735 | A1 * | 6/2003 | Itakura | 369/263 |
| 2007/0029149 | A1 * | 2/2007 | Ohki | 188/322.5 |
| 2007/0075469 | A1 * | 4/2007 | Yamazaki | 267/140.11 |
| 2007/0259141 | A1 * | 11/2007 | Ohki | 428/35.2 |

FOREIGN PATENT DOCUMENTS

| | | |
|---|---|---|
| JP | 05-321967 | 12/1993 |
| JP | 2001-057068 | 2/2001 |
| JP | 200444755 A * | 2/2004 |

OTHER PUBLICATIONS

Communication from European Patent Office dated Oct. 19, 2007 for application No. 06015430.9-2424.

* cited by examiner

*Primary Examiner*—Christopher P Schwartz
(74) *Attorney, Agent, or Firm*—Cermak Kenealy Vaidya & Nakajima LLP; Tomoko Nakajima

(57) ABSTRACT

Obtained is a viscous fluid-filled damper which makes it easy to determine whether or not a shaft or the like protruding from a supporting body side or a supported body side has been sufficiently inserted therein and which can be easily mounted on a supporting body or a supported body, and a mounting structure thereof. In the viscous fluid-filled damper, a shaft mounting portion of the viscous fluid-filled damper for damping vibrations between the supporting body and the supported body is provided with a shaft receiving hole for receiving the shaft, and a window hole intersecting the shaft receiving hole and having a hole port opening to a lateral surface of the shaft mounting portion. Therefore, it is easy to determine whether or not the shaft has been inserted correctly, and a large force for retaining the shaft is ensured.

21 Claims, 15 Drawing Sheets

Fig.13
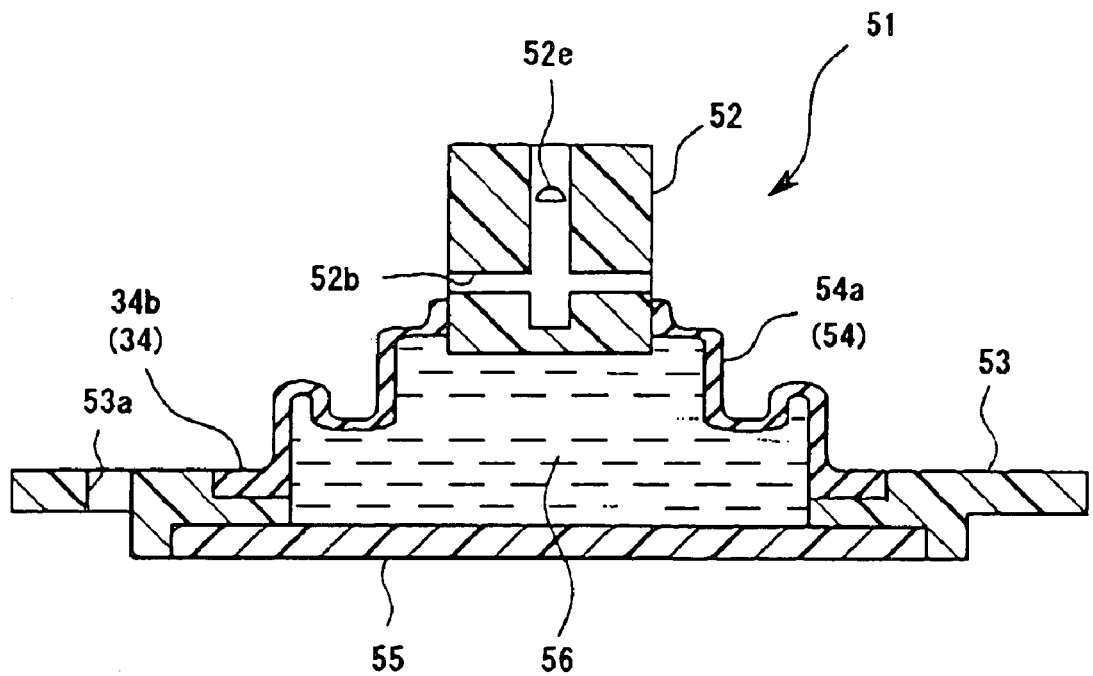
Fig.14A
Fig.14B
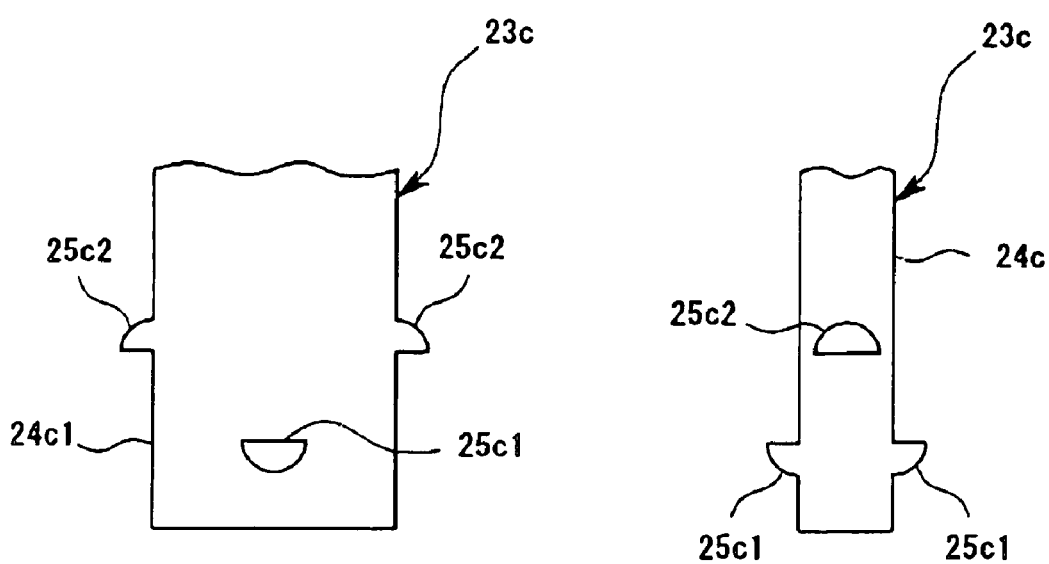

VISCOUS FLUID-FILLED DAMPER AND MOUNTING STRUCTURE FOR VISCOUS FLUID-FILLED DAMPER

BACKGROUND OF THE INVENTION

1. Field of the Invention

The present invention relates to vibration damper for disk devices such as optical disk devices and magneto-optical disk devices which are used for acoustic equipment, video equipment, information equipment, various kinds of precision equipment, and the like regardless of whether they are mounted on vehicles or designed for consumer products. In particular, the present invention relates to a viscous fluid-filled damper for damping vibrations of a supported body such as a mechanical chassis which is composed of a motor, an optical pickup, a disk table, and the like, and to a mounting structure of the viscous fluid-filled damper.

2. Description of the Related Art

As shown in FIG. 20 as an example, a disk device 1 is structured such that a disk 2 for recording and playback, such as an optical disk or a magneto-optical disk in a format of a CD or a CD-ROM, is horizontally chucked on a disk table 3, that the disk 2 is rotated integrally with the disk table 3, which is rotated by a motor, at a high speed, and that an optical pickup 4 approaches the disk 2 and tracks it in a radial direction of the disk 2 to record data thereon and play back the contents thereof. A coil spring 7 joins a mechanical chassis 5 to a box body 6 of the disk device 1, and a viscous fluid-filled damper 8 is interposed between the mechanical chassis 5 and the box body 6, so the disk device 1 blocks off or damps vibrations transmitted from the outside.

As shown in FIG. 21, the viscous fluid-filled damper 8 is obtained by sealing a viscous fluid 13 such as silicone oil in a sealed container. The sealed container is formed of a lid portion 9 made of a hard resin, a peripheral wall portion 10 made of a hard resin and rising vertically from the lid portion 9, a flexible portion 11 made of a thin rubber-like elastic material assuming a shape of bellows, and a stirring recess portion 12 protruding into the damper. The viscous fluid-filled damper 8 is mounted as follows. That is, while a screw 9b is inserted into a screw hole 9a provided through the lid portion 9 so as to fasten the viscous fluid-filled damper 8 on the box body 6, a stirring shaft 14 provided on the mechanical chassis 5 is inserted into the stirring recess portion 12 so as to couple the viscous fluid-filled damper 8 to the mechanical chassis 5.

In the viscous fluid-filled damper 8 according to this conventional example, the stirring recess portion 12 is formed of a rubber-like elastic material such as thermoplastic elastomer, which exhibits high flexibility. Therefore, workability in inserting the stirring shaft 14 into the stirring recess portion 12 is not good, and the stirring shaft 14 cannot be appropriately inserted into the stirring recess portion 12 in some cases. If the mechanical chassis 5 or the box body 6 is exposed to strong vibrations or a strong impact, the stirring shaft 14 may slide along an inner wall face 12a of the stirring recess portion 12 to cause an incomplete state of insertion or cause a deterioration in vibration damping function even when the stirring shaft 14 is inserted correctly. If the stirring shaft 14 has not been inserted correctly, such inconveniences become more likely to occur. Accordingly, the stirring shaft 14 is required at least to have been inserted into the stirring recess portion 12 correctly.

To confirm whether or not the stirring shaft 14 has been appropriately inserted into the stirring recess portion 12, there is a method in which the stirring recess portion 12 is pressed against the lid portion 9 to make a judgment depending on whether or not a tip of the stirring recess portion 12 bends. In this method, however, since the stirring recess portion 12 is pressed against the lid portion 9, the thin flexible portion 11 may be excessively extended and damaged.

To replace this method, there is known a viscous fluid-filled damper having a structure in which the stirring recess portion 12 and at least one of the peripheral wall portion 10 and the lid portion 9 are translucent as disclosed in, for example, JP 2001-57068 A. This viscous fluid-filled damper makes it possible to visually determine with ease whether or not the stirring shaft 14 has been inserted into the stirring recess portion 12 correctly, despite the structure in which the stirring shaft 14 is hidden inside the stirring recess portion 12.

However, the viscous fluid 13 that fills the damper is color-coded to distinguish between grades of merchandise or the like in some cases, even when the viscous fluid-filled damper disclosed in JP 2001-57068 A is used. In the case where the colored viscous fluid 13 is used, the state of insertion cannot be confirmed even when the stirring recess portion 12, the flexible portion 11, and the like are made translucent.

Moreover, in order to visually confirm an internal state, the translucency of the flexible portion 11 and the stirring recess portion 12 needs to be close to transparency. Therefore, a range of material selection is narrowed, and a rise in cost may be caused in some cases.

SUMMARY OF THE INVENTION

The present invention has therefore been made with a view to obtaining a viscous fluid-filled damper which makes it easy to determine whether or not the stirring shaft 14 has been sufficiently inserted into the stirring recess portion 12 and which can be easily mounted, and a mounting structure of the viscous fluid-filled damper.

According to the present invention, there is provided a viscous fluid-filled damper for damping vibrations, including: a sealed container including: a soft portion exhibiting rubber-like elasticity; a first hard portion on a supporting body side which is mounted on the supporting body; and a second hard portion on a supported body side which is mounted on the supported body accommodated in the supporting body; and a viscous fluid filling the sealed container, the viscous fluid-filled damper being interposed between the supporting body and the supported body, in which: one of the first hard portion on the supporting body side and the second hard portion on the supported body side has a shaft mounting portion connected to a shaft provided on one of the supporting body and the supported body; and the shaft mounting portion is provided with a shaft receiving hole for receiving the shaft, and a window hole intersecting the shaft receiving hole and having a hole port opening to a lateral surface of the shaft mounting portion.

At least one of the hard portion on the supporting body side and the hard portion on the supported body side has the shaft mounting portion connected to the shaft provided on the supporting body or the supported body, and the shaft mounting portion is provided with the shaft receiving hole for receiving the shaft, and the window hole extending across the shaft receiving hole and having the hole port opening to the lateral surface of the shaft mounting portion. Therefore, it is possible to see easily from the window hole whether or not the shaft has been sufficiently inserted into the shaft receiving hole. Thus, it is easy to determine whether or not the shaft has been inserted correctly. The shaft provided on the supporting body or the supported body is inserted into the shaft receiving hole made of the hard portion, so a larger force for retaining the shaft is ensured than that in the case where the shaft is inserted into the conventional stirring recess portion made of the rubber-like elastic material. Consequently, the shaft does not move within the shaft receiving hole and is unlikely to fall out. Thus, the viscous fluid-filled damper is unlikely to cause any inconvenience during use and is ensured of high quality. Furthermore, since the shaft is coupled to the shaft mounting portion having a predetermined structure with a large coupling force, there is no need to increase the coupling depth of the shaft in the axial direction thereof. Therefore, the viscous fluid-filled damper can be reduced in thickness and conforms to requirements such as a reduction in size or thickness of a disk device.

The window hole can be provided as the through-hole penetrating the shaft mounting portion. Since the window hole is provided as the through-hole, the way in which the shaft is inserted can be visually recognized in two directions, that is, from hole ports of the through-hole. In particular, since there is a crucial difference in visibility between a state in which the through-hole is open and a state in which the through-hole is closed, the way in which the shaft is inserted can be confirmed more reliably.

The window hole may allow a fall-out prevention protrusion provided on the shaft to abut thereon and make the fall-out prevention protrusion visually recognizable. Since the window hole allows the fall-out prevention protrusion provided on the shaft to abut thereon and makes the fall-out prevention protrusion visually recognizable, the fall-out prevention protrusion can be visually recognized from the window hole. As a result, a judgment on the way in which the shaft is inserted can be made reliably and easily.

Further, according to the present invention, there is provided a mounting structure for a viscous fluid-filled damper, including: the viscous fluid-filled damper for damping vibrations; a supporting body; and a supported body accommodated in the supporting body, the viscous fluid-filled damper including: a sealed container including: a soft portion exhibiting rubber-like elasticity; a first hard portion on a supporting body side which is mounted on the supporting body; and a second hard portion on a supported body side which is mounted on the supported body; and a viscous fluid filling the sealed container, the viscous fluid-filled damper being interposed between the supporting body and the supported body, in which: the viscous fluid-filled damper includes, at one of the first hard portion on the supporting body side and the second hard portion on the supported body side, a shaft mounting portion connected to a shaft provided on one of the supporting body and the supported body; the shaft mounting portion is provided with a shaft receiving hole for receiving the shaft, and a window hole intersecting the shaft receiving hole and having a hole port opening to a lateral surface of the shaft mounting portion; the shaft provided on one of the supporting body and the supported body is inserted into the shaft mounting portion of the viscous fluid-filled damper; the shaft is provided with a bulge portion protruding from a shaft spindle; the bulge portion of the shaft inserted in the shaft receiving hole protrudes toward the window hole and abuts on the window hole; and one of the supporting body and the supported body is connected to the viscous fluid-filled damper.

At least one of the hard portion on the supporting body side and the hard portion on the supported body side has the shaft mounting portion connected to the shaft provided on the supporting body or the supported body, and the shaft mounting portion is provided with the shaft receiving hole for receiving the shaft, and the window hole extending across the shaft receiving hole and having the hole port opening to the lateral surface of the shaft mounting portion. Therefore, it can be seen easily from the window hole whether or not the shaft has been sufficiently inserted into the shaft receiving hole. Thus, it is easy to determine whether or not the shaft has been inserted correctly.

The supporting body or the supported body has the shaft inserted in the shaft mounting portion of the viscous fluid-filled damper, and the shaft is provided with the bulge portion protruding from the shaft spindle. Therefore, the shaft can be inserted into the shaft receiving hole provided in the viscous fluid-filled damper, and the bulge portion can serve to prevent the shaft from falling out.

The bulge portion of the shaft inserted in the shaft receiving hole protrudes toward the window hole and abuts thereon, and the supporting body or the supported body is connected to the viscous fluid-filled damper, so the shaft is unlikely to fall out from the viscous fluid-filled damper. Further, the bulge portion can be visually recognized from the window hole. Therefore, it is possible to judge with ease whether or not the shaft has been inserted correctly and reliably.

The supported body may be a mechanical chassis for replaying a disk-type recording medium, and the supporting body may be a box body of the disk device. When the supported body and the supporting body are the mechanical chassis and the box body, respectively, the disk device, such as an optical disk device or a magneto-optical disk device, can be made compact and reduced in thickness without causing a reduction in vibration damping force of the disk device.

The viscous fluid-filled damper according to the present invention makes it easy to judge whether or not a correct state of mounting on the supporting body or the supported body has been achieved, and to carry out a process of assembling the disk device. In addition, since secure coupling to the supporting body or the supported body is ensured, fall out or a deterioration in vibration damping function does not occur even if the mechanical chassis or the box body is exposed to strong vibrations or a strong impact. As a result, a stable vibration damping effect can be achieved.

According to the mounting structure of the viscous fluid-filled damper according to the present invention, in addition to achieving the effect of the aforementioned viscous fluid-filled damper, it is also possible to make the disk device more compact and further reduce the thickness thereof.

The present invention is not restricted to the above description, and the advantages, features, and uses of the present invention will become further apparent from the following description given with reference to the accompanying drawings. Further, it should be understood that all appropriate modifications not departing from the gist of the present invention are to be covered by the scope of the present invention.

BRIEF DESCRIPTION OF THE DRAWINGS

In the accompanying drawings:

FIG. 13 is a cross-sectional view, which corresponds to FIG. 3, of the viscous fluid-filled damper of FIG. 12;

FIG. 14A is a partially enlarged front view of a shaft inserted in the viscous fluid-filled damper of FIG. 12; FIG. 14B is a partially enlarged right lateral view of the shaft inserted in the viscous fluid-filled damper of FIG. 12;

DETAILED DESCRIPTION OF THE PREFERRED EMBODIMENTS

Figure 1:
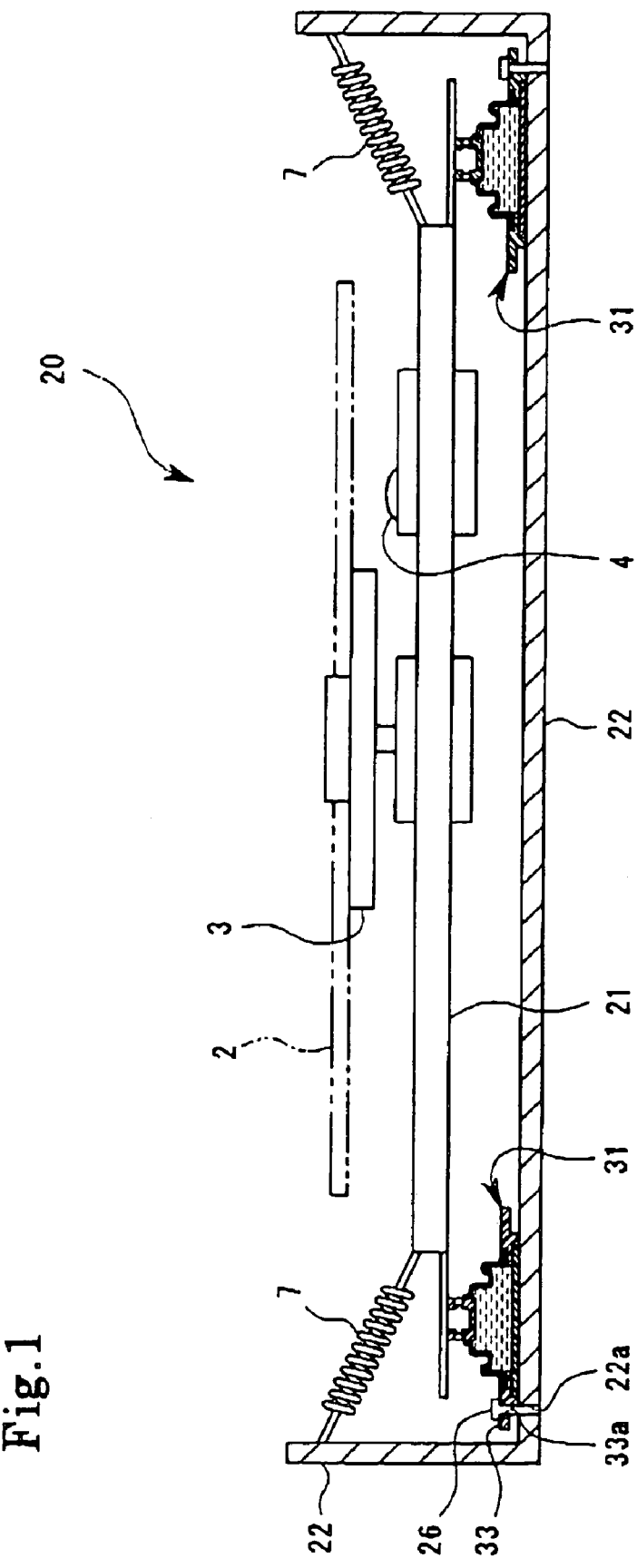
FIG. 1 is a schematic view showing viscous fluid-filled dampers according to a first embodiment of the present invention and a mounting structure thereof while representing an internal structure of a disk device.

The present invention will be described in detail with reference to the drawings. In the drawings, various portions and components are indicated by reference symbols. In embodiments of the present invention, the same description will not be repeated when there is no change in materials, manufacturing methods, and the like of respective members.

First Embodiment

FIGS. 2 to 5

FIG. 1 shows viscous fluid-filled dampers 31 according to the first embodiment of the present invention and mounting structures thereof. The viscous fluid-filled dampers 31 may be mounted between a mechanical chassis 21 and a box body 22 for supporting the mechanical chassis 21. The mechanical chassis 21 can be composed of a motor, a disk table 3, an optical pickup 4, and the like in a disk device 20. The disk device 20 being an optical disk device or a magneto-optical disk device is within the scope of the invention.

Figure 2:
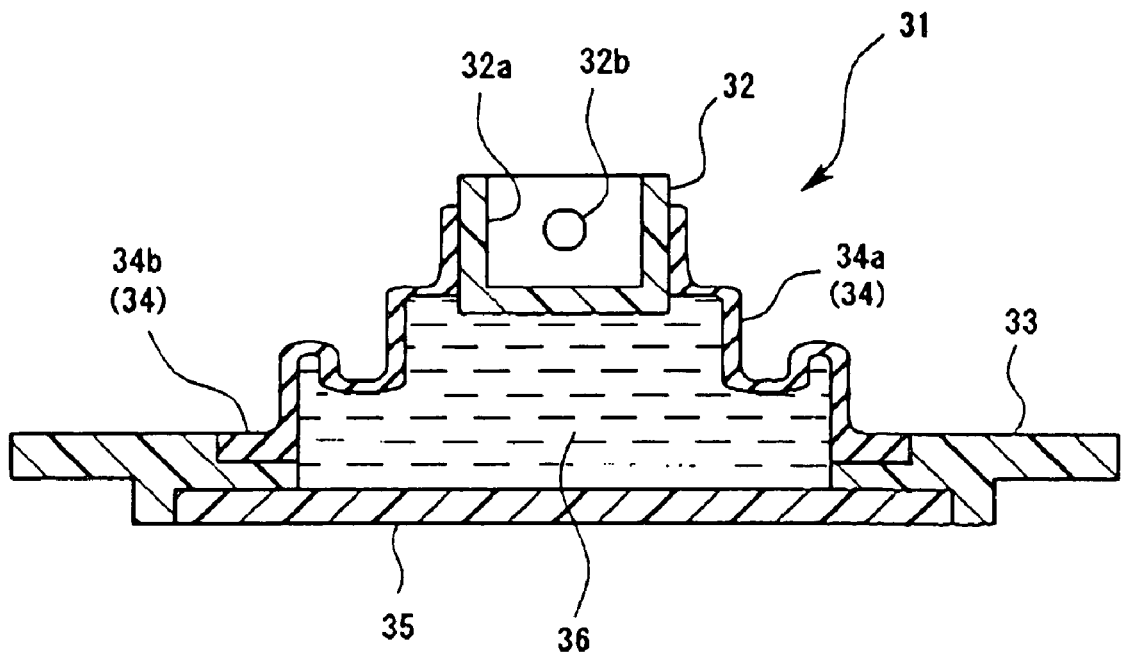
FIG. 2 is a cross-sectional view, which is taken along the line II-II of FIG. 5, showing the viscous fluid-filled damper according to the first embodiment of the present invention.
Figure 3:
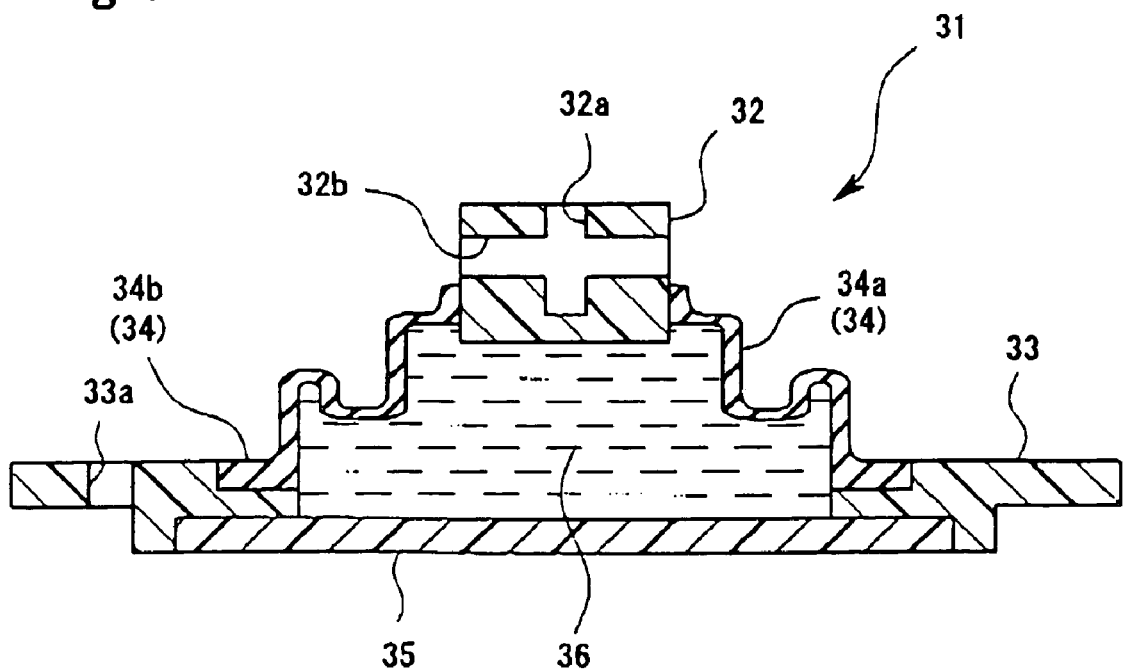
FIG. 3 is a cross-sectional view, which is taken along the line II-II, of the viscous fluid-filled damper of FIG. 5.
Figure 4:
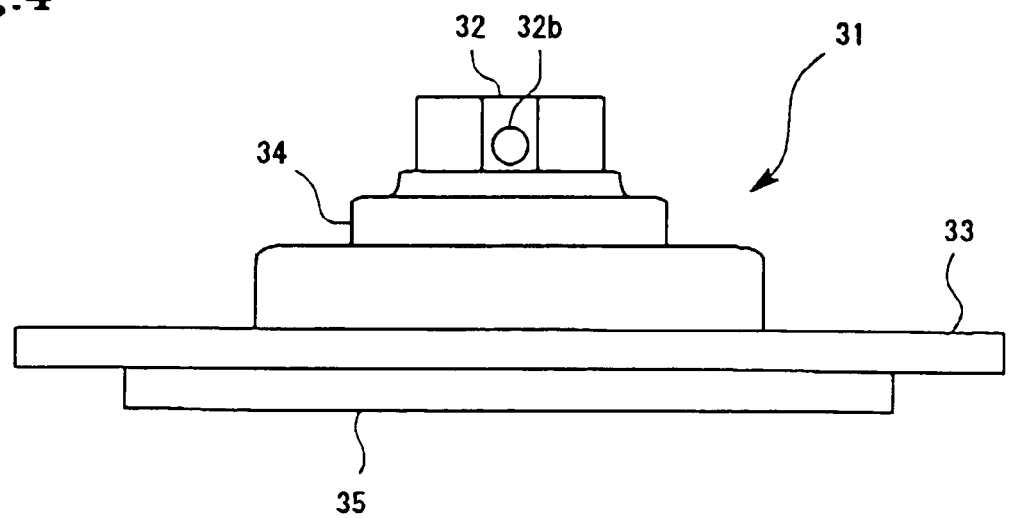
FIG. 4 is a front view of the viscous fluid-filled damper of FIG. 5.
Figure 5:
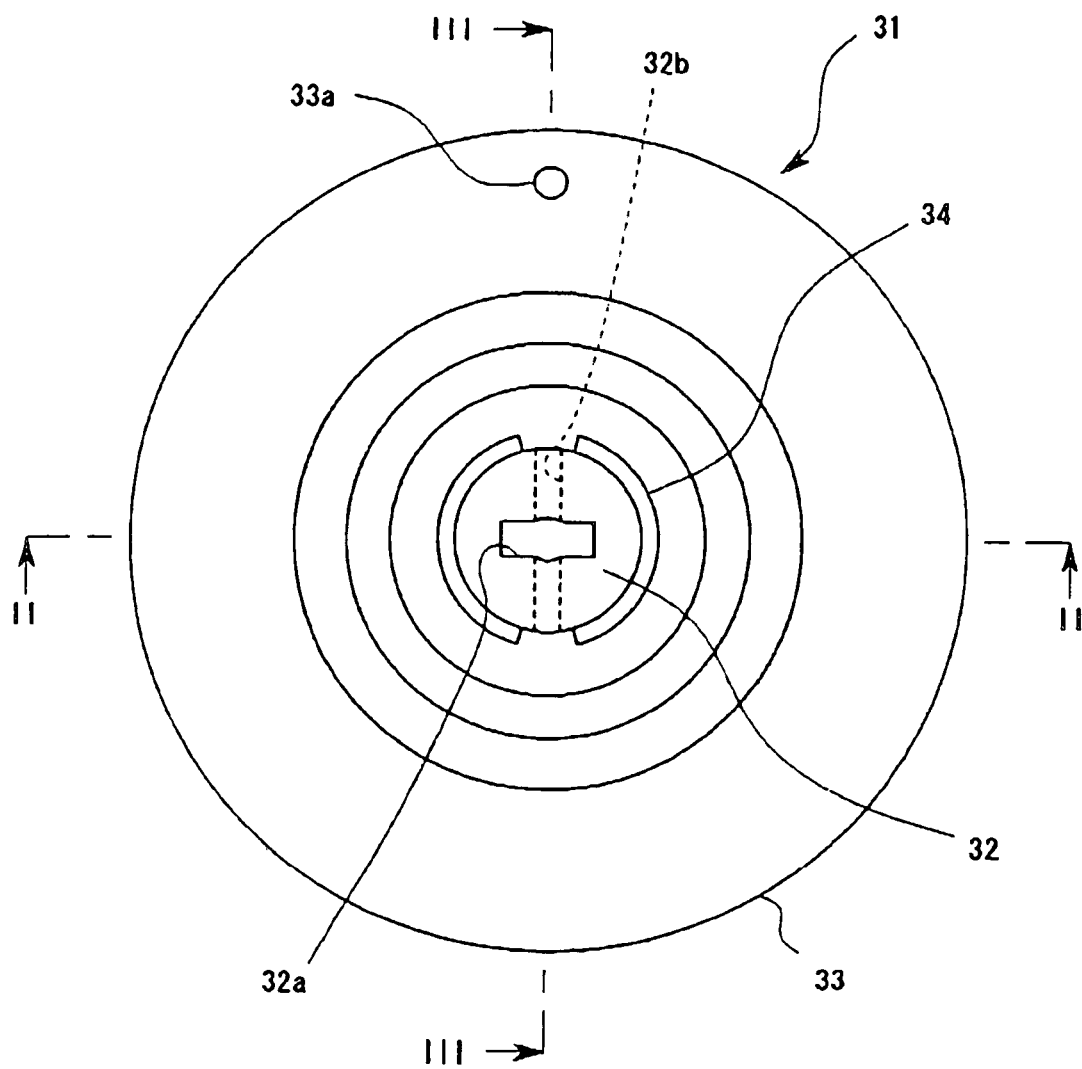
FIG. 5 is a plan view of the viscous fluid-filled damper according to the first embodiment of the present invention.

FIGS. 2 and 3 are cross-sectional views each showing the viscous fluid-filled damper 31. FIG. 4 is a front view of the viscous fluid-filled damper 31. FIG. 5 is a plan view of the viscous fluid-filled damper 31. As shown in FIGS. 2 to 5, the viscous fluid-filled damper 31 has a structure in which a viscous fluid 36 fills "a sealed container". The viscous fluid-filled damper 31 may be constructed by joining a lid portion 35 to a container body. The container body can be obtained by connecting a shaft mounting portion 32 to an annular connection portion 33 via a flexible portion 34. The lid portion 35 can be made of a hard resin. The shaft mounting portion 32 can be made of a hard resin. Furthermore, the annular connection portion 33 can be made of a hard resin. Also, the flexible portion 34 can be made of a rubber-like elastic material. Up-and-down directions and right-and-left directions are not uniquely determined depending on a manner in which the viscous fluid-filled damper 31 is mounted or on a region where the viscous fluid-filled damper 31 is mounted to. For convenience of explanation, however, the following description will be made on the assumption that the shaft mounting portion 32 is located above and that the lid portion 35 is located below.

The shaft mounting portion 32 is provided with a shaft receiving hole 32a for receiving a shaft 23a provided on the mechanical chassis 21. The shaft receiving hole 32a may be a vertically extending hole. This vertically extending hole having a generally rectangular cross-sectional shape, as shown in FIG. 5, is within the scope of the invention.

As shown in FIG. 3, a window hole 32b passing through the shaft mounting portion 32 is provided in a direction perpendicular to the shaft receiving hole 32a. The window hole 32b extends to at least one lateral surface of the shaft mounting portion 32, the window hole 32b at a lateral surface of the shaft mounting portion 32 forming a hole port. By extending to at least one lateral surface of the shaft mounting portion 32, the window hole 32b appears on a surface of the viscous fluid-filled damper 31 without being covered with the flexible portion 34 or the like.

The shaft mounting portion 32 in the viscous fluid-filled damper 31 is connected to the flexible portion 34. This shaft mounting portion 32 may allow a reduction in the height of the container body. Therefore, the viscous fluid-filled damper 31 can be made compact and reduced in thickness.

The flexible portion 34 is structured to have a bellows portion 34a and a collar portion 34b. The bellows portion 34a is adapted to fluctuate upon receiving a vibration. This bellows portion 34a can be made of a rubber-like elastic material. Moreover, the bellows portion 34a may assume the shape of a bellows. The collar portion 34b, which extends in a direction parallel to the lid portion 35 (i.e., horizontal direction), is adapted to contribute to coupling with a hard portion.

The collar portion 34b has a larger horizontal cross-sectional area than that of the bellows portion 34a.

The annular connection portion 33 is provided to ensure that the container body containing the viscous fluid 36 can be easily secured to the lid portion 35. The annular connection portion 33 may assume a shape of a flat doughnut. The annular connection portion 33 is coupled to the collar portion 34b of the flexible portion 34 in the direction parallel to the lid portion 35 (i.e., horizontal direction: radial direction). Thus, a large contact area is ensured between the collar portion 34b and the annular connection portion 33 to sufficiently couple the collar portion 34b with the annular connection portion 33.

Figure 6A:
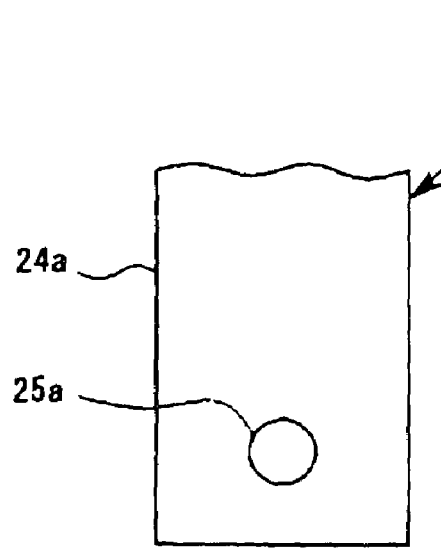
FIG. 6A is a partially enlarged front view of a shaft inserted in the viscous fluid-filled damper of FIG. 1.
Figure 6B:
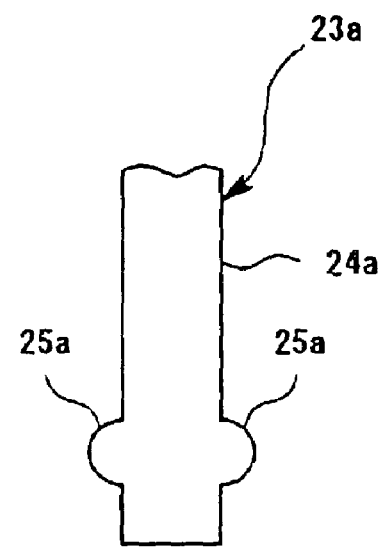
FIG. 6B is a partially enlarged right lateral view of the shaft inserted in the viscous fluid-filled damper of FIG. 1.

A shaft 23a may be disposed between the viscous fluid-filled damper 31 and the mechanical chassis 21. The shaft 23a has a shaft spindle 24a extending like a rod, and bulge portions 25a and 25a protruding from the shaft spindle 24a at a distal end of the shaft 23a. The shaft spindle 24a and the bulge portions 25a correspond in shape and size to the shaft receiving hole 32a and the window hole 32b of the viscous fluid-filled damper 31, respectively. In this case, as shown in FIG. 6A and FIG. 6B, the bulge portions 25a and 25a can be hemispherical in shape, and may protrude from the shaft spindle 24a. The shaft spindle 24a may be cylindrical in shape.

Next, the materials constituting the respective portions of the viscous fluid-filled damper 31 will be described. A thermoplastic resin may be selected as the hard resin forming the shaft mounting portion 32, the annular connection portion 33, and the lid portion 35. This thermoplastic resin should exhibit good workability and allows integral molding with the rubber-like elastic material. This thermoplastic resin may be a material from the group consisting of a polyethylene resin, a polypropylene resin, a polyvinyl chloride resin, a polystyrene resin, an acrylonitrile-styrene-acrylate resin, an acrylonitrile-butadiene-styrene resin, a polyamide resin, a polyacetal resin, a polycarbonate resin, a polyethylene terephthalate resin, a polybutylene terephthalate resin, a polyphenylene oxide resin, a polyphenylene sulfide resin, a polyurethane resin, a polyphenylene ether resin, a modified polyphenylene ether resin, a silicone resin, a polyketone resin, and liquid crystal polymer. Any of these thermoplastic resins can be used either alone or as composite materials. Furthermore, each of these thermoplastic resins has been found suitable to achieve performance considerations that are required of the shaft mounting portion 32, the annular connection portion 33, and the lid portion 35. These performance considerations may include dimensional accuracy, heat resistance, mechanical strength, durability and reliability, a reduction in weight, and workability of the shaft mounting portion 32, the annular connection portion 33, and the lid portion 35. Powdery or fibrous metal, glass, or a filling material such as a filler may be added to any of the thermoplastic resins identified hereinabove. The powdery or fibrous metal, glass, or a filling material can enhance the dimensional accuracy or the heat resistance of the thermoplastic resin.

A synthetic rubber or a thermoplastic elastomer may be used for the flexible portion 34. Examples of the synthetic rubber include a material from the group consisting of styrene butadiene rubber, butadiene rubber, chloroprene rubber, nitrile butadiene rubber, butyl rubber, urethane rubber, silicone rubber, fluorine rubber, and acryl rubber. Examples of the thermoplastic elastomer include a material from the group consisting of various kinds of thermoplastic elastomer of styrene type, olefin type, urethane type, ester type, and vinyl chloride type.

The viscous fluid 36 is adapted to viscously flow within the sealed container to absorb vibrational energy. Thus, the viscous fluid 36 should exhibit appropriate viscosity, long-term stability within the sealed container, heat resistance, and the like. It is preferable either to use the viscous fluid 36 in the form of a liquid alone or to add solid particles exhibiting no reactivity and no solubility to the liquid to the viscous fluid 36. For instance, in addition to silicone oil as a single substance, silicone grease or the like including solid particles exhibiting no reactivity and no solubility to silicone oil scattered therein, can be mentioned. Examples of the silicone oil include a material from the group consisting of dimethyl silicone oil, methyl phenyl silicone oil, methyl hydrogen silicone oil, and fluorine modified silicone oil. Either a material from the group consisting of silicone resin powder, polymethylsilsesquioxane powder, wet silica powder, dry silica powder, glass bead, and glass balloon; or a material obtained by subjecting any of those particles to surface treatment can be mentioned as the solid particles exhibiting no reactivity and no solubility to the silicone oil. Those liquids and solid particles can be used either alone or in combination with one another. In the case of using for such type of equipment as suffers a defect due to generation of siloxane or the like, non-silicone grease including solid particles exhibiting no reactivity and no solubility to oils scattered therein, the oils being of poly-α-olefin type, paraffin type, polyethylene glycol type, and the like, can also be used as a substitute for the silicone oil or the silicone grease. The same substances as described above can be used as the solid particles.

The viscous fluid-filled damper 31 can be integrally formed by a resin molding method such as co-injection molding of a hard resin material and a soft resin material. For instance, after the shaft mounting portion 32, the flexible portion 34, and the annular connection portion 33 have been integrated with one another by the co-injection molding, insert molding, or the like to form the container body, the container body is filled with the viscous fluid 36 and the viscous fluid 36 is sealed up with the lid portion 35. Both the annular connection portion 33 on the container body side and the lid portion 35 can be made of the hard resin, so the container body and the lid portion 35 can be easily coupled to each other by ultrasonic fusing or the like.

The shaft 23a provided on the mechanical chassis 21 may be formed of a metal instead of the hard resin.

Figure 7:
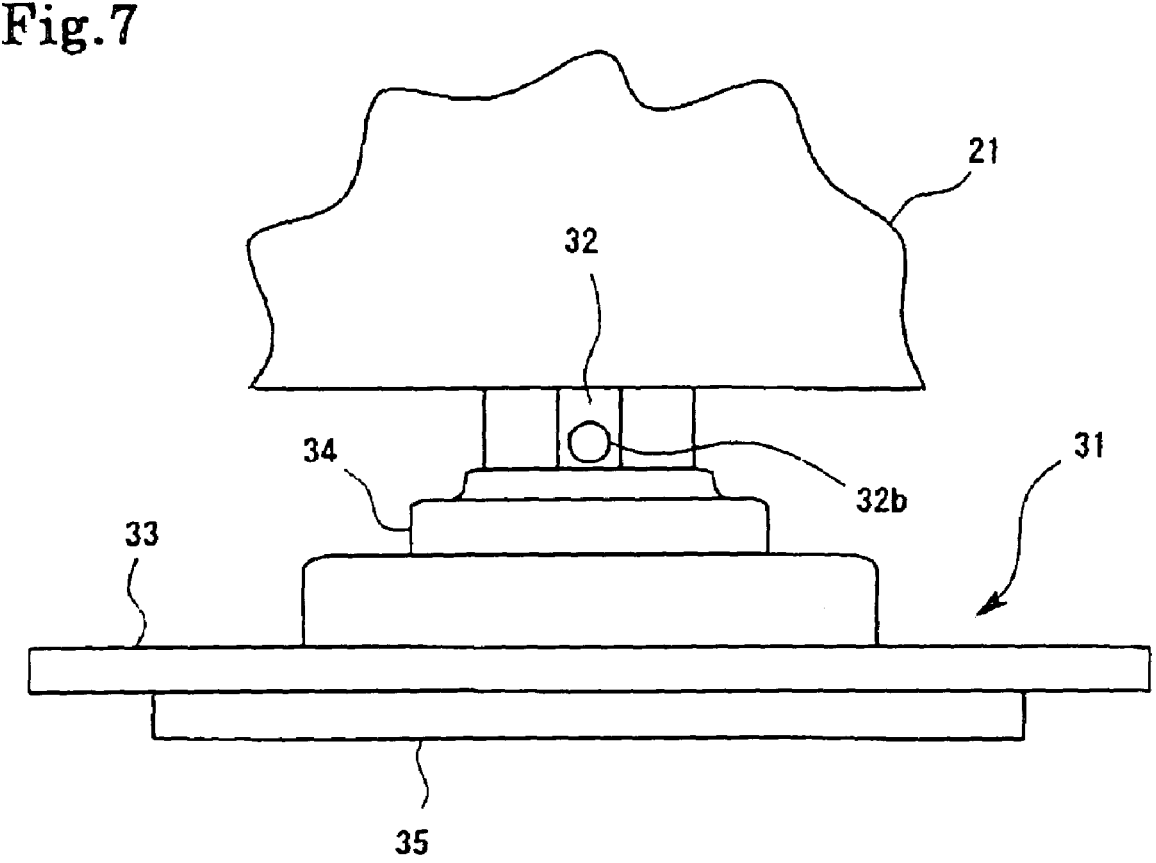
FIG. 7 is a front view of a state in which the viscous fluid-filled damper of FIG. 1 is mounted to a mechanical chassis.
Figure 8:
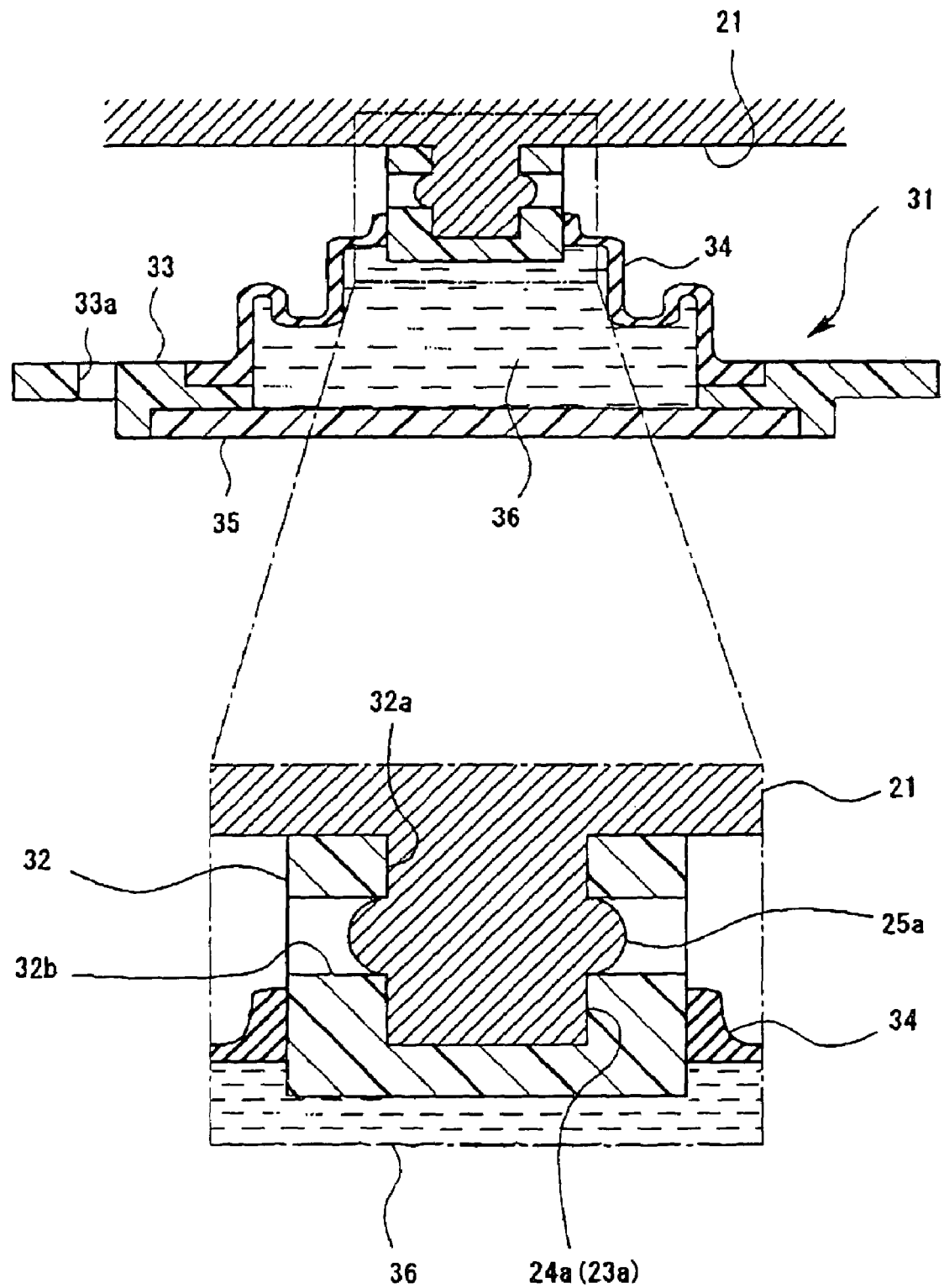
FIG. 8 is a cross-sectional view, which corresponds to a cross-section along the line III-III of FIG. 5, of the state in which the viscous fluid-filled damper of FIG. 1 is mounted to the mechanical chassis.

To connect the viscous fluid-filled damper 31 to the mechanical chassis 21, the shaft 23a provided on the mechanical chassis 21 is inserted into the shaft receiving hole 32a of the viscous fluid-filled damper 31. The portion of the shaft spindle 24a having the bulge portions 25a protruding therefrom is wider than the shaft spindle 24a. As a result, mechanical interference is present in passing the bulge portions 25a through the shaft receiving hole 32a. When the bulge portions 25a reach the window hole 32b, the bulge portions 25a protrude from the shaft receiving hole 32a into the window hole 32b. As a result of protruding into the window hole 32b, the bulge portions 25a abut on a boundary region between the shaft receiving hole 32a and the window hole 32b. The shaft receiving hole 32a may correspond in shape to the shaft spindle 24a, so the shaft spindle 24a is secured and fitted to the shaft receiving hole 32a. In this manner, the viscous fluid-filled damper 31 and the mechanical chassis 21 are coupled to each other. FIGS. 7 and 8 show a state in which the viscous fluid-filled damper 31 and the mechanical chassis 21 have been coupled to each other.

As described above, a change in press-in resistance could occurs or a sound could be generated in some cases when the bulge portions 25a of the shaft 23a reach the window hole 32b. In consequence, it is easy to understand that the shaft 23a has been mounted at a predetermined position of the shaft mounting portion 32. The way in which the shaft 23a is inserted is recognizable when viewed from the window hole 32. Therefore, it can be confirmed with ease whether or not the shaft 23a has been inserted well, depending on whether or not the bulge portions 25a are visually recognizable.

The viscous fluid-filled damper 31 may be connected to the supporting body such as the box body 22 to be a mounting object on the other side by passing a screw 26 through a screw hole 33a provided through the annular connection portion 33 and a screw hole 22a provided through the box body 22 and then tightening the screw 26, as shown in FIG. 1.

The viscous fluid-filled damper 31 thus obtained and the mounting structure thereof ensure reliable connection to the box body 22 of the disk device 20 and the mechanical chassis 21, and an unbreakable coupling state resistant to strong vibrations in any direction. Therefore, the disk device 20 exhibiting stable anti-vibration properties can be obtained. Further, the clearance between the mechanical chassis 21 and the box body 22 can be narrowed; so the disk device 20 can be made compact and reduced in thickness.

The shaft 23a provided to the supporting body or a supported body can be formed of the hard resin or the metal, and the shaft receiving hole 32a of the viscous fluid-filled damper 31 also can be formed of the hard resin. Therefore, hard members are adapted to be coupled to each other, so a coupling portion thereof is unlikely to be deformed. As a result, a secure coupling state can be achieved. Thus, the viscous fluid-filled damper 31 that do not come off easily and the mounting structure thereof can be obtained.

Second Embodiment

Figure 9:
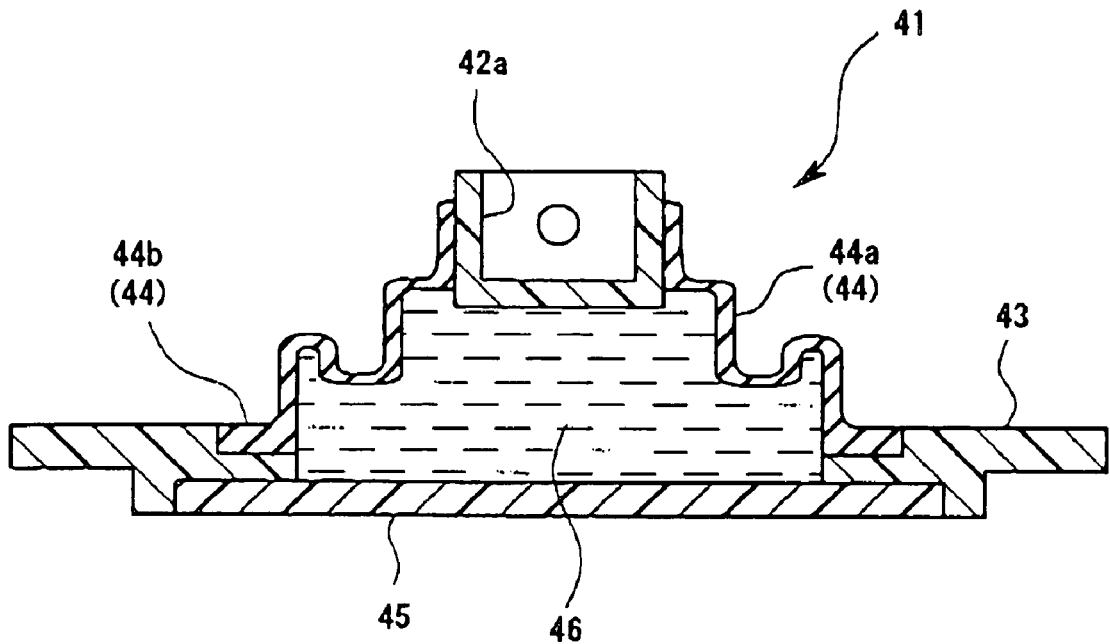
FIG. 9 is a cross-sectional view, which corresponds to FIG. 1, showing a viscous fluid-filled damper according to a second embodiment of the present invention.
Figure 10:
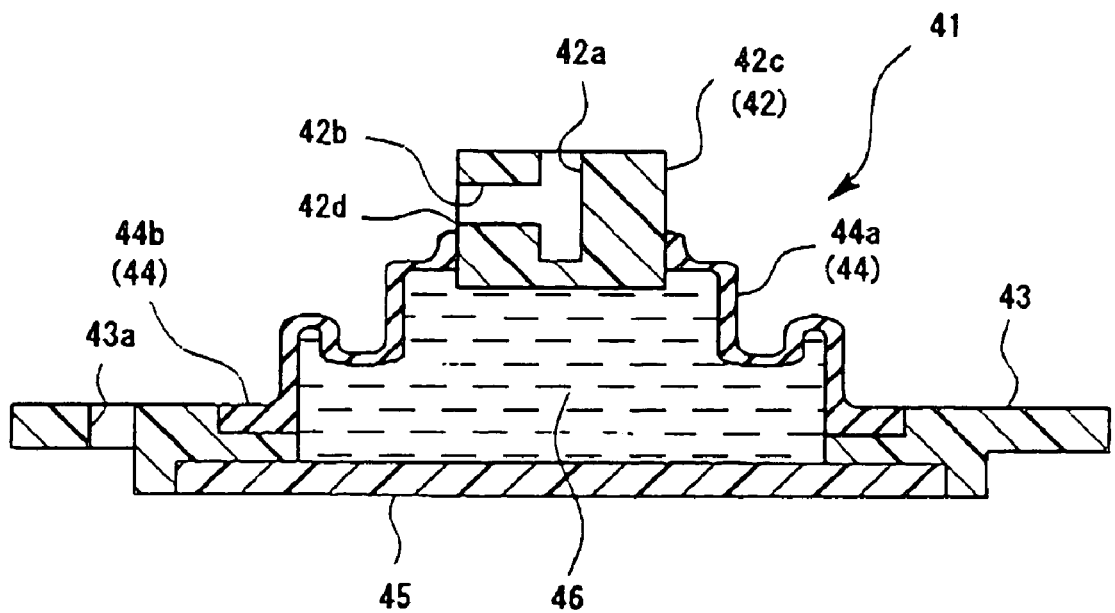
FIG. 10 is a cross-sectional view, which corresponds to FIG. 3, of the viscous fluid-filled damper of FIG. 9.

FIGS. 9 and 10

FIGS. 9 and 10 show a viscous fluid-filled damper 41 according to the second embodiment of the present invention. The viscous fluid-filled damper 41 according to the second embodiment of the present invention is different from the viscous fluid-filled damper 31 according to the first embodiment of the present invention in that a window hole 42b does not pass through a damper mounting portion 42 and a hole port 42d is formed so as to open only in one direction to a lateral surface 42c of the damper mounting portion 42. The viscous fluid-filled damper 41 according to the second embodiment of the present invention is identical to the viscous fluid-filled damper 31 according to the first embodiment of the present invention in other constructional details and the members to be used. The mounting structure according to the second embodiment of the present invention is also identical to the mounting structure according to the first embodiment of the present invention.

Figure 11A:
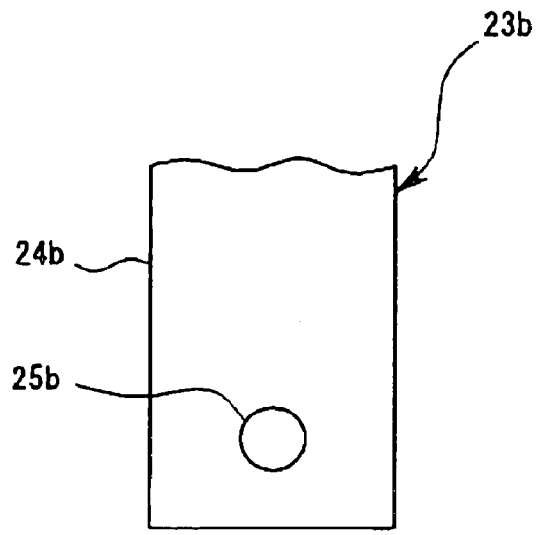
FIG. 11A is a partially enlarged front view of a shaft inserted in the viscous fluid-filled damper of FIG. 9.
Figure 11B:
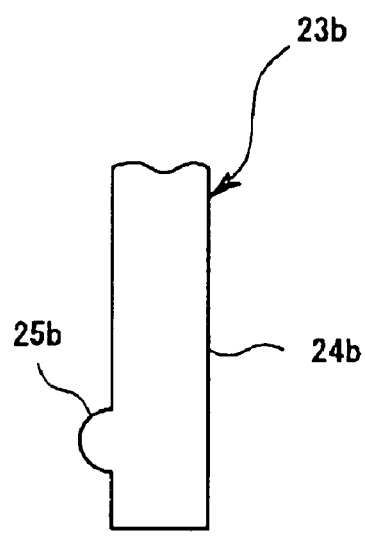
FIG. 11B is a partially enlarged right lateral view of the shaft inserted in the viscous fluid-filled damper of FIG. 9.

A shaft 23b provided to the mechanical chassis 21 also corresponds in construction to the shaft receiving hole 42a and the window hole 42b of the viscous fluid-filled damper 41. As shown in FIG. 11A and FIG. 11B, a single bulge portion 25b is provided on a shaft spindle 24b.

The window hole 42b is provided as is the case with the first embodiment of the present invention, so the way in which the shaft 23b is inserted can be visually recognized from the window hole 42b. Thus, a determination on the state of coupling between the shaft 23b and the viscous fluid-filled damper 41 can be made with ease.

Third Embodiment

Figure 12:
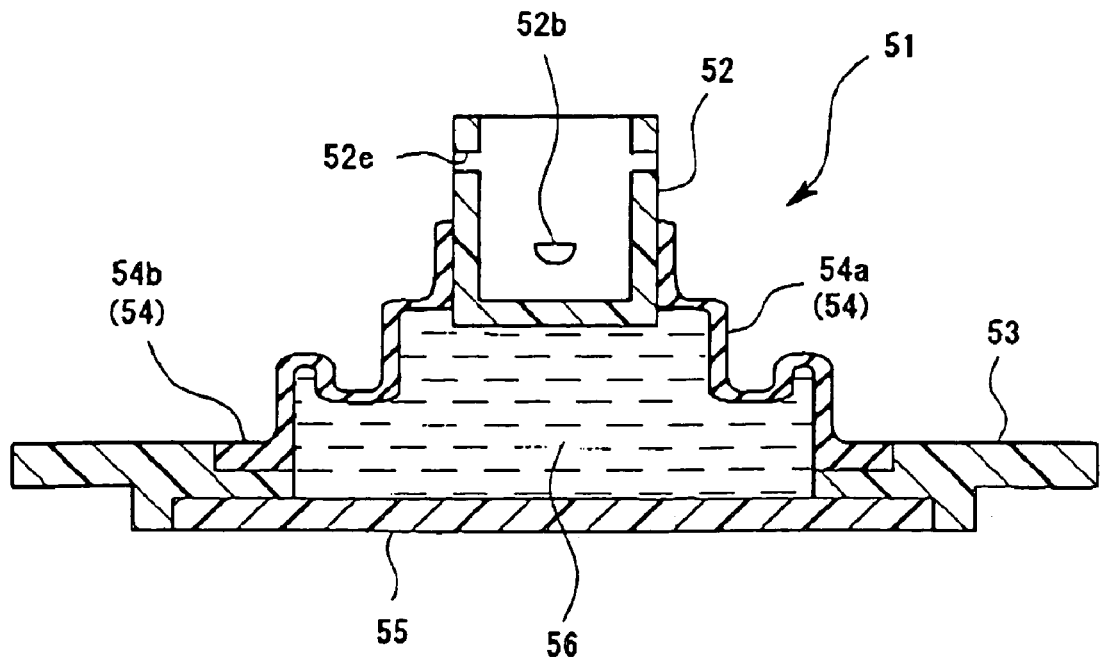
FIG. 12 is a cross-sectional view, which corresponds to FIG. 1, showing a viscous fluid-filled damper according to a third embodiment of the present invention.

FIGS. 12 and 13

FIGS. 12 and 13 show a viscous fluid-filled damper 51 according to the third embodiment of the present invention. The viscous fluid-filled damper 51 according to the third embodiment of the present invention is different from the viscous fluid-filled damper 31 according to the first embodiment of the present invention in that two window holes are provided thereto. That is, a second window hole 52e is provided separately from a first window hole 52b. The window holes 52b and 52e are formed such that their cross-sections across a hole direction assume shapes of semicircles that are oriented in opposite directions. Due to the provision of the window holes 52b and 52e, a shaft mounting portion 52 is slightly longer in a vertical direction than in a horizontal direction. The viscous fluid-filled damper 51 according to the third embodiment of the present invention is identical to the viscous fluid-filled damper 31 according to the first embodiment of the present invention in other constructional details and the members to be used.

A shaft 23c provided on the mechanical chassis 21 also has first bulge portions 25c1 and 25c1 and second bulge portions 25c2 and 25c2 formed thereon and located at positions corresponding to the first window hole 52b and positions corresponding to the second window hole 52e, respectively, as shown in FIG. 14A and FIG. 14B.

The viscous fluid-filled damper 51 according to the third embodiment of the present invention has many regions where the bulge portions engages with the window holes. Therefore, a more secure state of coupling between the shaft 23c and the viscous fluid-filled damper 51 can be achieved.

Fourth Embodiment

Figure 15:
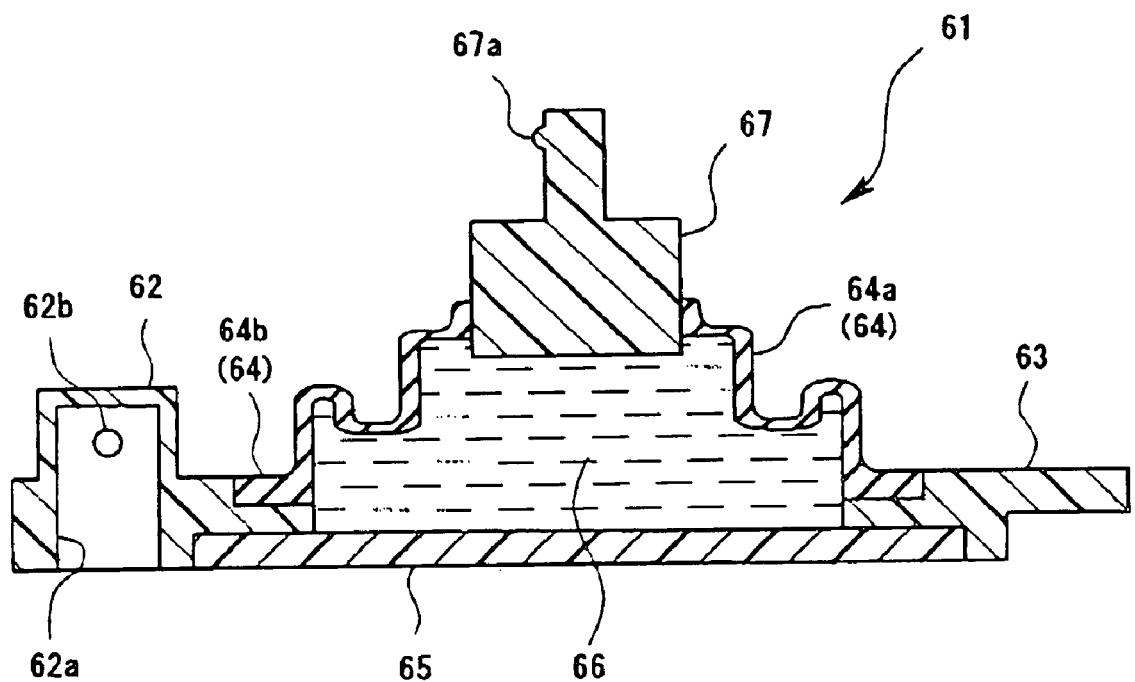
FIG. 15 is a cross-sectional view, which corresponds to FIG. 1, showing a viscous fluid-filled damper according to a fourth embodiment of the present invention.
Figure 16:
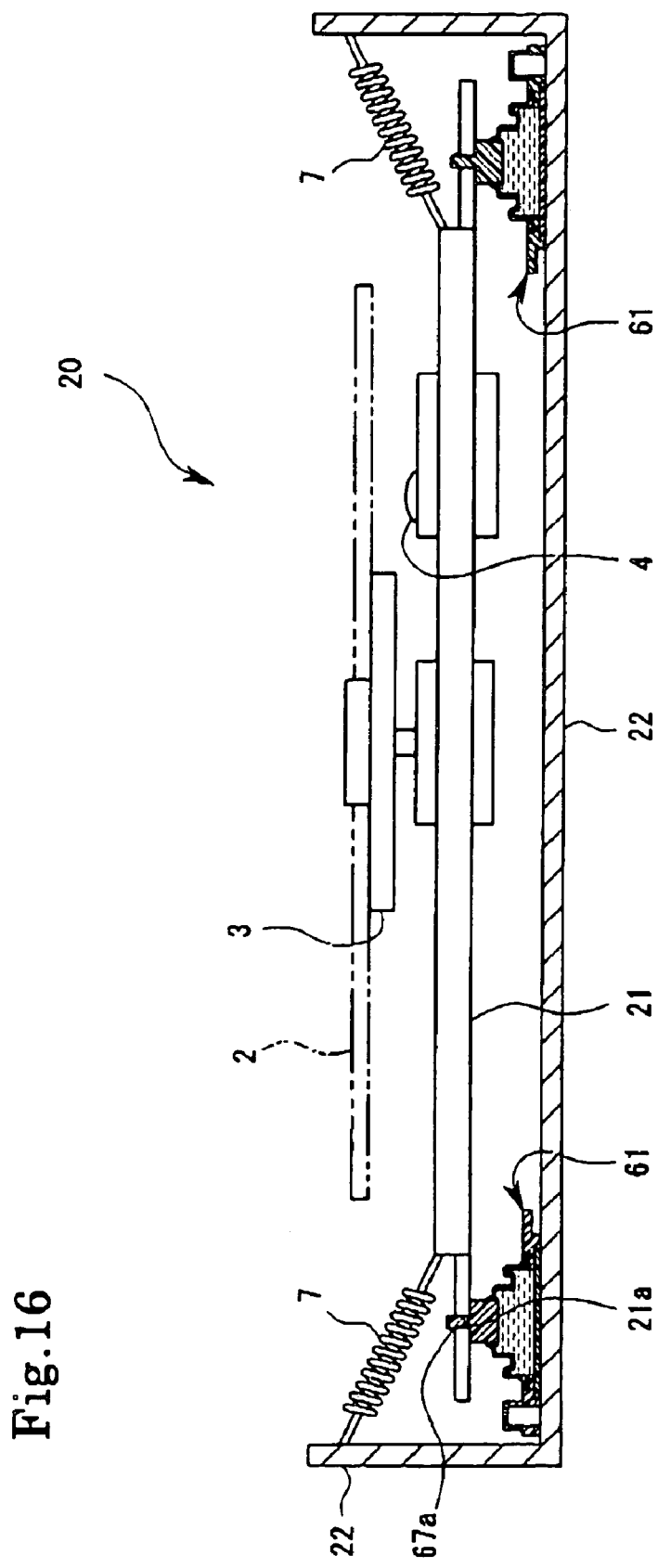
FIG. 16 is a schematic view showing the viscous fluid-filled damper according to the fourth embodiment of the present invention and a mounting structure thereof while representing an internal structure of a disk device.

FIGS. 15 and 16

FIG. 15 shows a viscous fluid-filled damper 61 according to the fourth embodiment of the present invention. FIG. 16 shows a state in which the viscous fluid-filled damper 61 is mounted to the disk device 20. The viscous fluid-filled damper 61 according to the fourth embodiment of the present invention and the mounting structure thereof are different from the viscous fluid-filled damper 31 according to the first embodiment of the present invention and the mounting structure thereof in that a shaft mounting portion 62 is provided on a lower side of the viscous fluid-filled damper 61 (i.e., lid portion 65 side). An upper hard portion 67, which is provided with a fall-out prevention protrusion 67a inserted into and engaged with a through-hole 21a provided on the mechanical chassis 21 side, is located on an upper side of the viscous fluid-filled damper 61. The viscous fluid-filled damper 61 according to the fourth embodiment of the present invention is identical to the viscous fluid-filled damper 31 according to the first embodiment of the present invention in other constructional details and the members to be used.

The viscous fluid-filled damper 61 according to the fourth embodiment of the present invention ensures that a secure connection state can be achieved with ease even in the case of connection with a region below the viscous fluid-filled damper 61, that is, the box body 22.

Modified Examples of Embodiments

Figure 17:
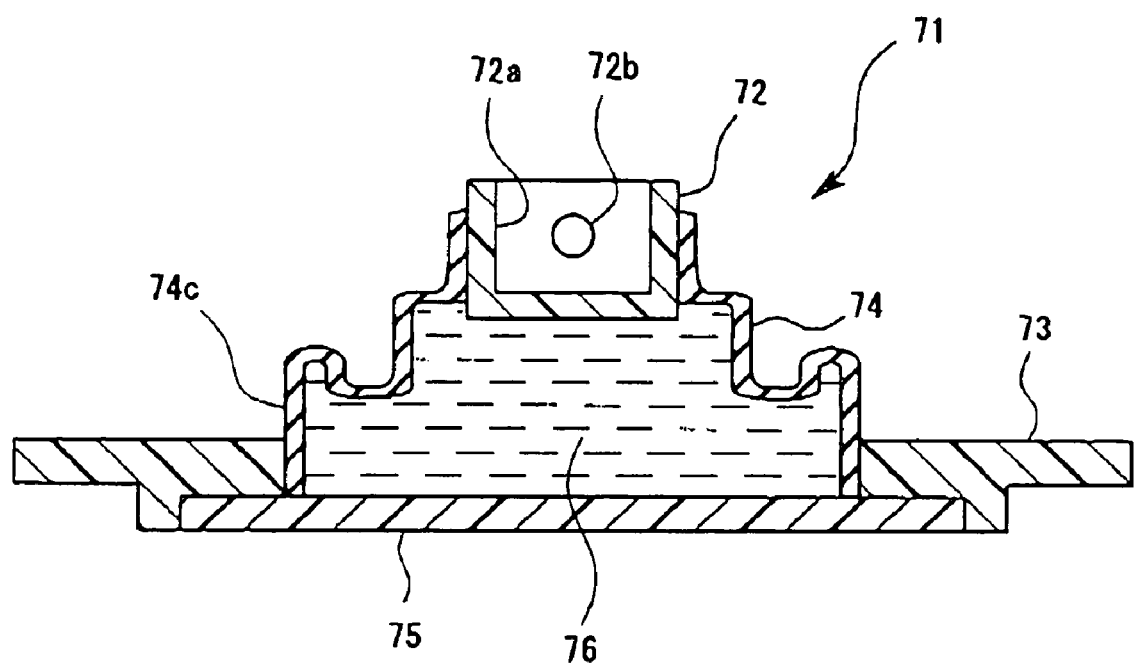
FIG. 17 is a cross-sectional view, which corresponds to FIG. 1, showing the viscous fluid-filled damper according to the fourth embodiment of the present invention.

In the constructions illustrated in the first to third embodiments of the present invention, the flexible portions 34, 44, and 54 have the collar portions 34b, 44b, and 54b, respectively. For example, however, as a modified example of the viscous fluid-filled damper 31 illustrated in the first embodiment of the present invention, an annular connection portion 73 having a certain thickness in the vertical direction can be used as in the case of a viscous fluid-filled damper 71 shown in FIG. 17. By adopting the annular connection portion 73 as described above, coupling with the annular connection portion 73 on a lateral surface 74c of a flexible portion 74 is made possible even in the case of a shape lacking the collar portion 34b. A large contact area between the flexible portion 34 and the annular connection portion 73 is ensured in a direction perpendicular to a plane of the lid portion 35 (i.e., vertical direction), thereby enabling coupling to a sufficient degree without the necessity to ensure a large width in the horizontal direction.

Figure 18:
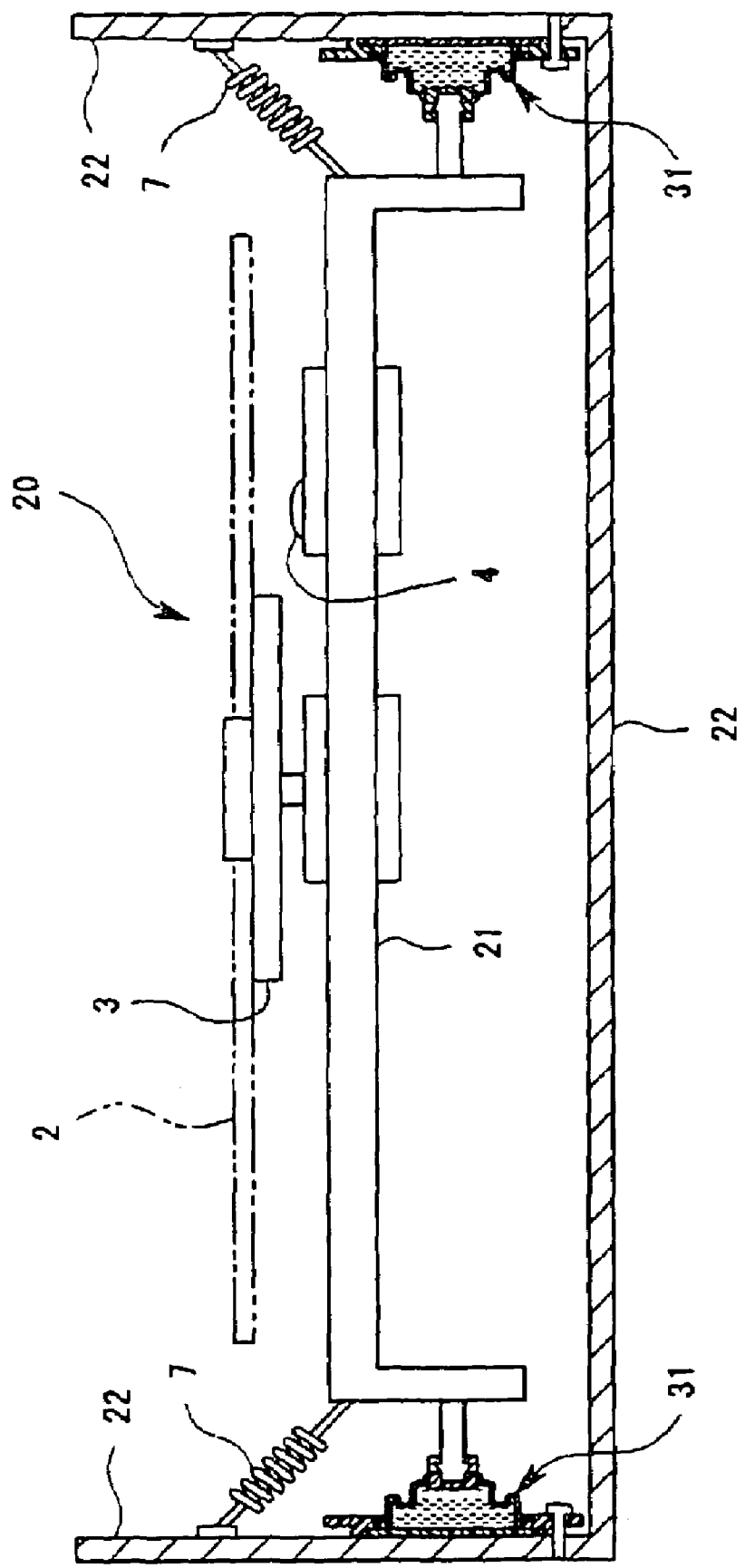
FIG. 18 is a schematic view showing a mounting structure of a viscous fluid-filled damper according to a modified example of the embodiments of the present invention while representing an internal structure of a disk device.
Figure 19:
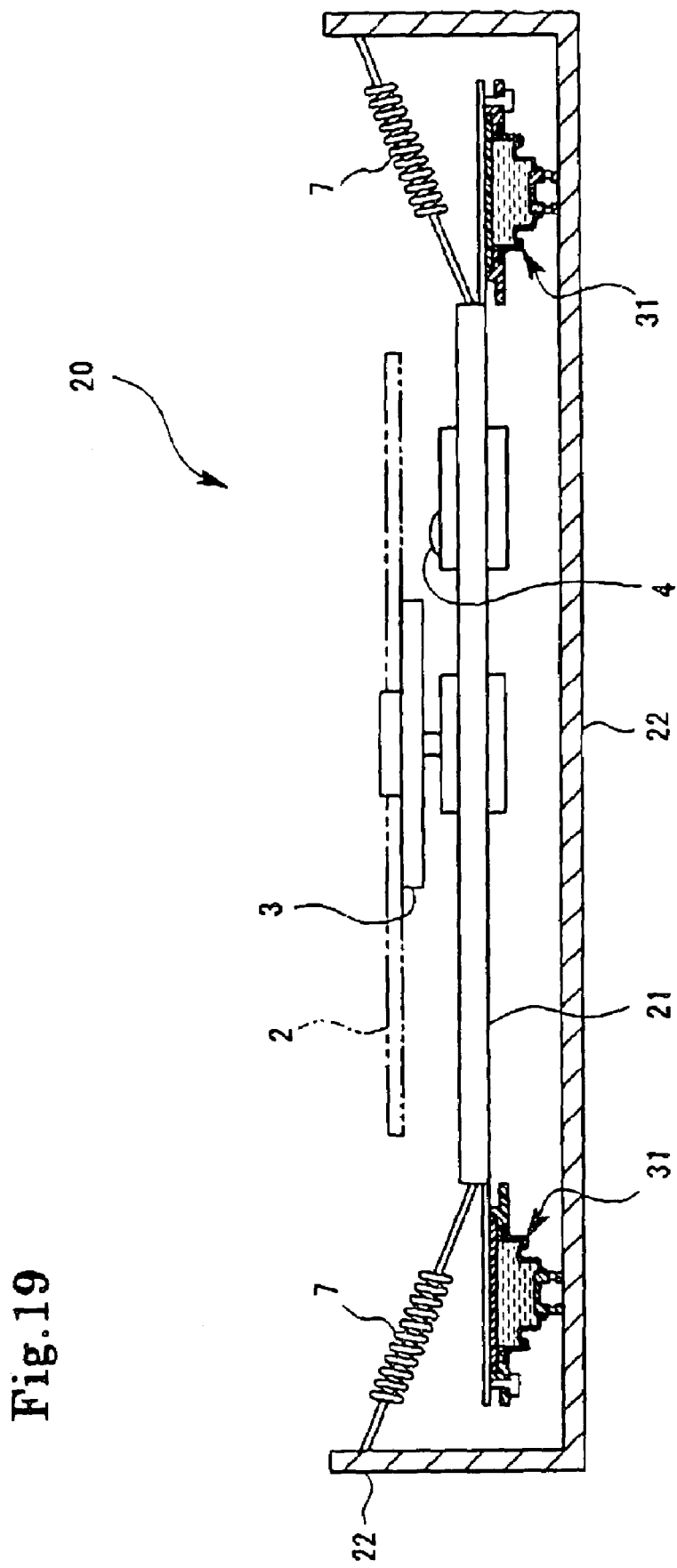
FIG. 19 is a schematic view showing a mounting structure of a viscous fluid-filled damper according to another modified example of the embodiments of the present invention while representing an internal structure of a disk device.
Figure 20:
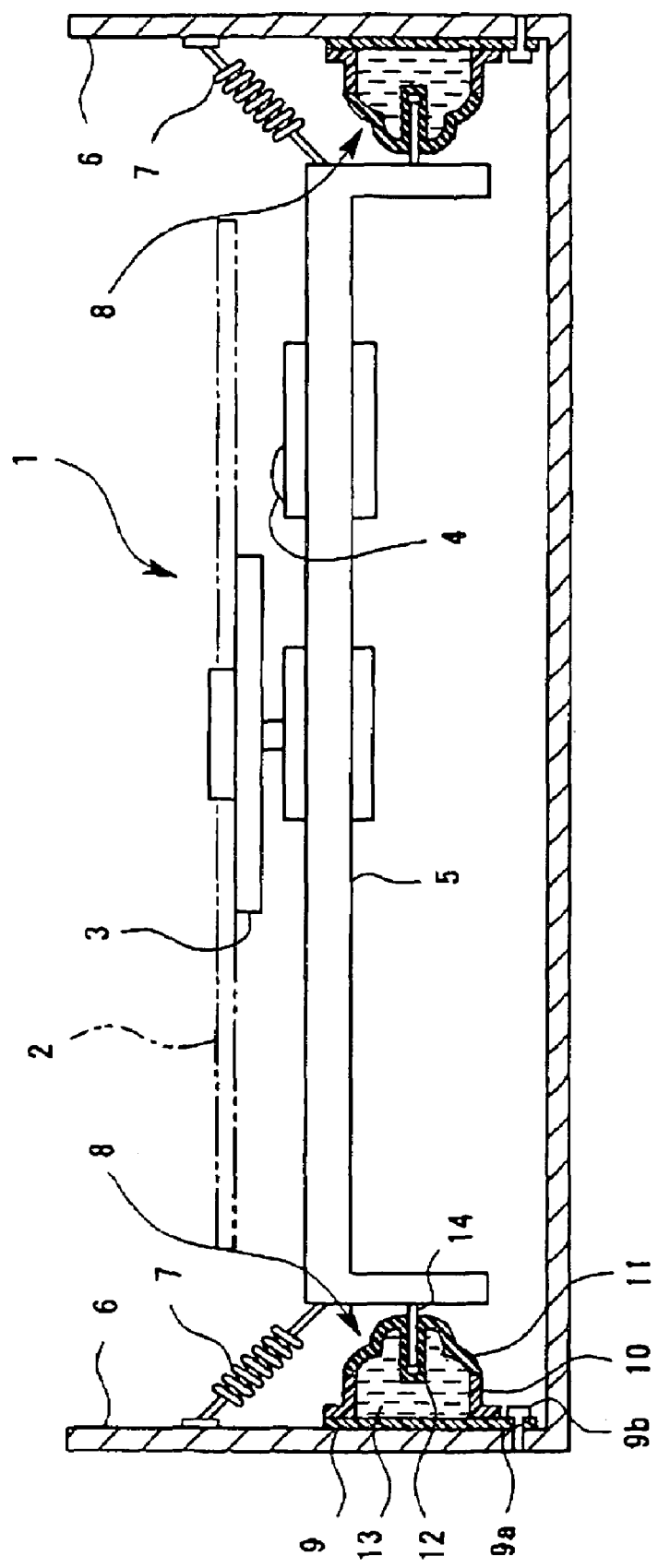
FIG. 20 is a schematic view showing an internal structure of a disk device mounted with a conventional viscous fluid-filled damper.
Figure 21:
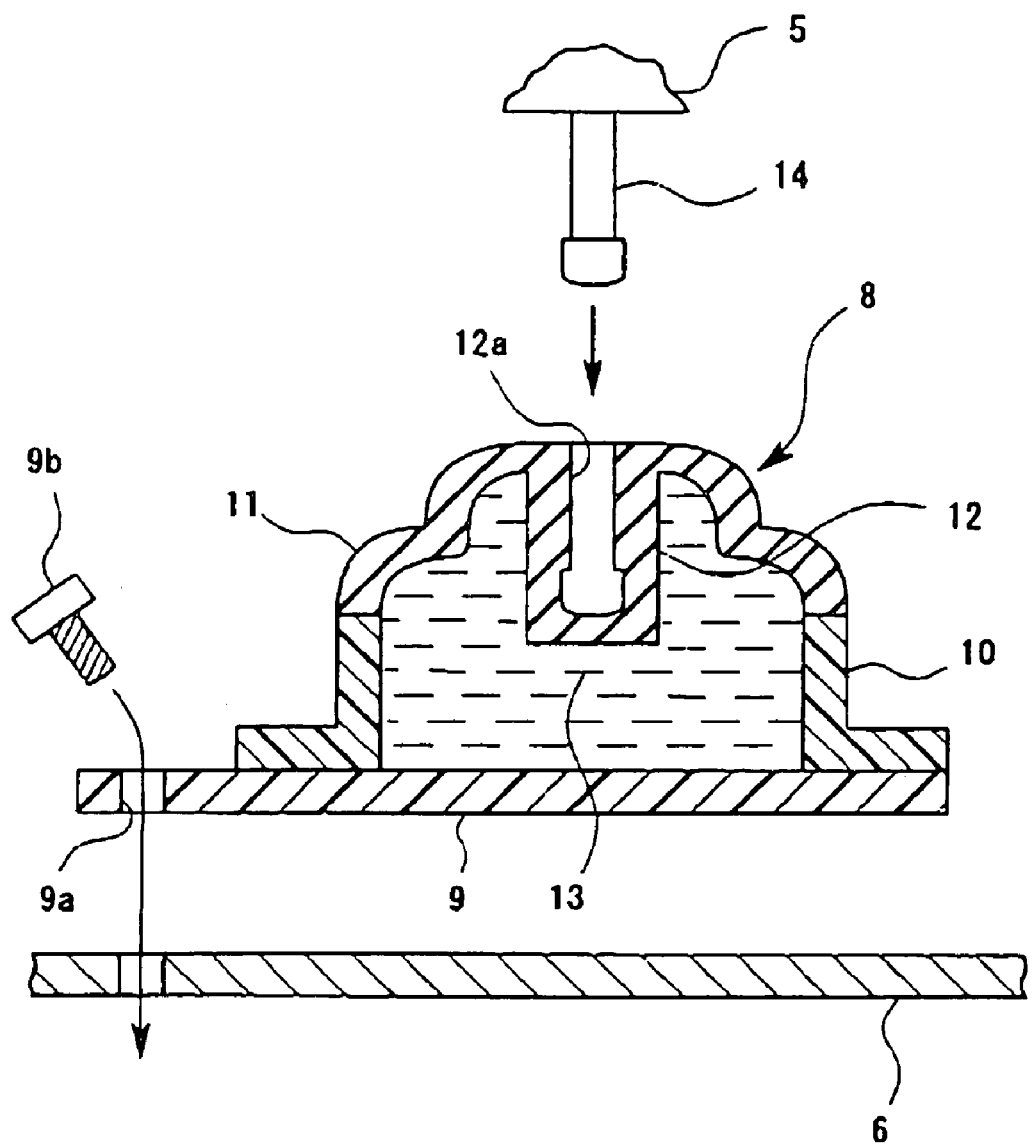
FIG. 21 is an explanatory diagram for explaining a method of mounting the conventional viscous fluid-filled damper shown in FIG. 20 to a mechanical chassis and a box body.

The viscous fluid-filled dampers 31, 41, and 51 according to the first to third embodiments, respectively, of the present invention, are each connected to the box body 22 by screwing. However, this should not be construed restrictively. For instance, it is also possible to adopt a construction in which each of the annular connection portions 33, 43, and 53 or the lid portions 35, 45, and 55 are provided with projecting portions and the box body 22 is provided with a depressed portion so that they are fitted and coupled to each other. Alternatively, each of the viscous fluid-filled dampers may also have a predetermined coupling end shape referred to as snap fit to be mounted on the box body 22. Further, as shown in FIG. 18, the mounting position with respect to the mechanical chassis 21 may also be changed. As shown in FIG. 19, it is also possible to adopt a mounting structure in which the viscous fluid-filled damper 31 is connected at an upper side thereof and a lower side thereof to the box body 22 and the mechanical chassis 21, respectively. In the same way, the construction illustrated in the fourth embodiment of the present invention is not obligatory in connecting the viscous fluid-filled damper 61 according to the fourth embodiment of the present invention at the upper side thereof to the mechanical chassis 21, and any other connector such as snap fit may be adopted.

In the respective embodiments of the present invention, the shaft receiving holes 32a, 42a, 52a, 62a, and 72a and the window holes 32b, 42b, 52b, 52e, 62b, and 72b may assume a cross-sectional shape corresponding to those of the shaft, for example, a triangle or a semicircle as well as an oblong or a circle.

The bulge portions 25a, 25b, 25c1, and 25c2 of the shafts 23a, 23b, and 23c may be colored differently from the other portions, so the reliability in visually recognizing the bulge portions 25a, 25b, 25c1, and 25c2 from the window holes 32b, 42b, 52b, 52e, 62b, and 72b can further be enhanced.

The shaft mounting portions 32, 42, 52, 62, and 72 according to the respective embodiments of the present invention are not so shaped as to protrude far into the sealed container, but may be designed instead to be equipped with a so-called stirring rod protruding into the sealed container as in the case of, for example, the stirring recess portion 12 provided in the conventional viscous fluid-filled damper 8.

In the respective embodiments of the present invention, the shaft mounting portions 32, 42, 52, 62, and 72 can be made transparent. If the shaft mounting portions 32, 42, 52, 62, and 72 are made transparent, the way in which the shaft spindles 24a, 24b, and 24c are inserted as well as the bulge portions 25a, 25b, 25c1, and 25c2 can be seen from the window holes 32b, 42b, 52b, 52e, 62b, and 72b. As a result, it is possible to more accurately determine whether or not the shafts 23a, 23b, and 23c have been inserted correctly.

The present invention makes it possible to damp vibrations of a mechanical chassis composed of a motor, an optical pickup, a disk table, and the like, and thus can serve to damp vibrations of a disk device such as an optical disk device or a magneto-optical disk device. However, the use of the present invention should not be limited to those disk devices. That is, the present invention may also be applied to various kinds of electric equipment and electronic equipment whose vibrations need to be controlled.

The description of the present invention should not be construed restrictively; advantages, features, and uses of the present invention will become still more apparent from the following description given with reference to the accompanying drawings. Further, it should be understood that all appropriate modifications made without departing from the gist of the present invention are covered by the scope of the present invention. While various embodiments of the present invention are described, it should be understood that they have been presented by way of example only, and not as a limitation. Thus, the breadth and scope of the present invention should not be limited by any of the above-described exemplary embodiments.

What is claimed is:

1. A viscous fluid-filled damper for damping vibrations, comprising:
    a sealed container, comprising:
        a soft portion exhibiting rubberlike elasticity;
        a first hard portion on a supporting body side which is mounted on the supporting body; and
        a second hard portion on a supported body side which is mounted on the supported body accommodated in the supporting body; and
    a viscous fluid filling the sealed container,
        the viscous fluid-filled damper being interposed between the supporting body and the supported body,
        one of the first hard portion on the supporting body side and the second hard portion on the supported body side having a shaft mounting portion connected to a shaft provided on one of the supporting body and the supported body,
    wherein the shaft mounting portion is provided with a shaft receiving hole with a closed end and an open end for receiving the shaft, and a window hole intersecting the shaft receiving hole and having a hole port opening to a lateral surface of the shaft mounting portion, and
    the window hole is located to make insertion of the shaft visually recognizable.

2. A viscous fluid-filled damper according to claim 1, wherein the window hole is provided as a through-hole passing through the shaft mounting portion.

3. A viscous fluid-filled damper according to claim 1, wherein the window hole extends from the shaft receiving hole as a base point to the hole port opening to the lateral surface of the shaft mounting portion.

4. A viscous fluid-filled damper according to claim 1, wherein the window hole is formed of a plurality of window holes arranged along a hole depth direction of the shaft receiving hole.

5. A viscous fluid-filled damper according to claim 1, wherein the window hole exists as a plurality of through-holes intersecting the shaft receiving hole in different directions.

6. A viscous fluid-filled damper according to claim 1, wherein the window hole allows a fall-out prevention protrusion provided on the shaft to abut on the window hole and makes the fall-out prevention protrusion visually recognizable.

7. A viscous fluid-filled damper according to claim 1, wherein the soft portion includes a bellows portion assuming a shape of bellows to fluctuate upon receiving vibrations, and a collar portion extending in a direction parallel to a lid portion to contribute toward coupling to the hard portion.

8. A viscous fluid-filled damper according to claim 1, wherein the shaft mounting portion is transparent.

9. The viscous fluid-filled damper for damping vibrations according to claim 1, wherein the shaft has a bulge portion to be placed partially in the window hole.

10. A mounting structure for the viscous fluid-filled damper, comprising:
   a viscous fluid-filled damper for damping vibrations;
   a supporting body; and
   a supported body accommodated in the supporting body, for mounting the viscous fluid-filled damper,
   the viscous fluid-filled damper, comprising:
      a sealed container, comprising:
         a soft portion exhibiting rubber-like elasticity;
         a first hard portion on a supporting body side which is mounted on the supporting body; and
         a second hard portion on a supported body side which is mounted on the supported body; and
      a viscous fluid filling the sealed container,
   the viscous fluid-filled damper being interposed between the supporting body and the supported body, wherein:
   the viscous fluid-filled damper includes, at one of the first hard portion on the supporting body side and the second hard portion on the supported body side, a shaft mounting portion connected to a shaft provided on one of the supporting body and the supported body;
   the shaft mounting portion is provided with a shaft receiving hole with a closed end and an open end for receiving the shaft, and a window hole intersecting the shaft receiving hole and having a hole port opening to a lateral surface of the shaft mounting portion;
   the window hole being located to make insertion of the shaft visually recognizable;
   the shaft provided on one of the supporting body and the supported body is inserted into the shaft mounting portion of the viscous fluid-filled damper;
   the shaft is provided with a bulge portion protruding from a shaft spindle;
   the bulge portion of the shaft inserted in the shaft receiving hole protrudes toward the window hole and abuts on the window hole; and
   one of the supporting body and the supported body is connected to the viscous fluid-filled damper.

11. A mounting structure for the viscous fluid-filled damper according to claim 10, wherein the window hole is provided as a through-hole passing through the shaft mounting portion.

12. A mounting structure for the viscous fluid-filled damper according to claim 10, wherein the window hole extends from the shaft receiving hole as a base point to the hole port opening to the lateral surface of the shaft mounting portion.

13. A mounting structure for the viscous fluid-filled damper according to claim 10, wherein the window hole is formed of a plurality of window holes arranged along a hole depth direction of the shaft receiving hole.

14. A mounting structure for the viscous fluid-filled damper according to claim 10, wherein the window hole exists as a plurality of through-holes intersecting the shaft receiving hole in different directions.

15. A mounting structure for the viscous fluid-filled damper according to claim 10, wherein the window hole allows a fall-out prevention protrusion provided on the shaft to abut on the window hole and makes the fall-out prevention protrusion visually recognizable.

16. A mounting structure for the viscous fluid-filled damper according to claim 10, wherein the soft portion includes a bellows portion assuming a shape of bellows to fluctuate upon receiving vibrations, and a collar portion extending in a direction parallel to a lid portion to contribute toward coupling to the hard portion.

17. A mounting structure for the viscous fluid-filled damper according to claim 10, wherein the shaft mounting portion is transparent.

18. A mounting structure for the viscous fluid-filled damper according to claim 10, wherein the sealed container is constructed by joining a lid portion made of a hard resin to a container body, which is obtained by connecting the shaft mounting portion made of a hard resin to an annular connection portion through an intermediation of a flexible portion made of a rubber-like elastic material.

19. A mounting structure for the viscous fluid-filled damper according to claim 10, wherein the sealed container is constructed by joining a lid portion made of a hard resin to a container body, which is obtained by connecting an upper hard portion made of a hard resin to an annular connection portion through an intermediation of a flexible portion made of a rubber-like elastic material, and
   the upper hard portion has a fallout prevention protrusion inserted into and engaged with a through-hole provided through one of the supporting body and the supported body.

20. A mounting structure for the viscous fluid-filled damper according to claim 10, wherein the bulge portion is colored differently from a portion of the shaft which is different from the bulge portion.

21. A mounting structure for the viscous fluid-filled damper according to claim 10, wherein:
   the supported body is a mechanical chassis for replaying a disk-type recording medium; and
   the supporting body is a box body of a disk device.

* * * * *